Patented May 18, 1954

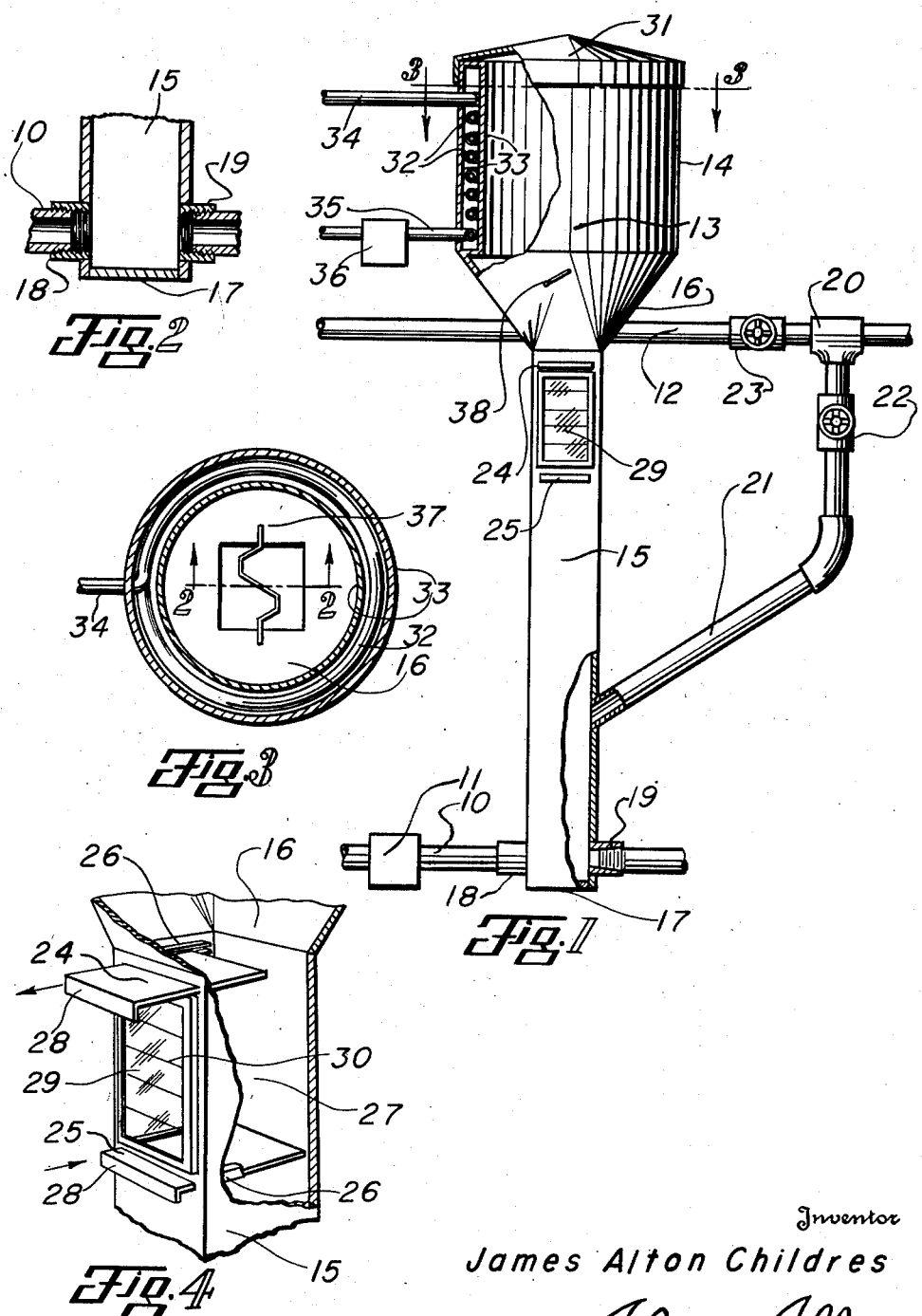

2,678,850

UNITED STATES PATENT OFFICE 2,678,850

SOLVENT FILTERING SYSTEM AND FILTER POWDER DISPENSER FOR SUCH SYSTEM

James Alton Childres, Palestine, Tex.

Application February 21, 1949, Serial No. 77,534

4 Claims. (Cl. 302—15)

This invention relates to new and useful improvements in solvent filtering systems and filter powder dispensers for such systems.

The invention is particularly adapted for use in clothing cleaning establishments in which it is the practice to filter repeatedly the solvent or solvents used in the cleaning process, and is adapted to provide for storage and handling of the filter powder employed in the course of such filtering.

One object of the invention is to provide an improved filter powder dispenser of the character described having means for storing a considerable quantity of filter powder at one time and for maintaining said powder in a dry condition so that it is immediately ready for use, and so that it is maintained in a condition of maximum effectiveness.

Yet another object of the invention is to provide an improved dispenser having means for discharging measured quantities of filter powder into the solvent filtering system, such dispensing being effected at such times and in such quantities as may be desirable or necessary in accordance with the quantity of solvent on hand or being processed, and the condition of such solvent.

A still further object of the invention is to provide an improved filtering system for solvents in which the solvent may be by-passed and conducted to a filter along with the filter powder without disturbing or interfering with any other apparatus which may be connected into the system.

A particular object of the invention is to provide an improved filtering system for the solvents used in clothing cleaning systems in which the clothing washer may be allowed to operate in cleaning the clothes, and at the same time, measured quantities of filter powder may be passed to the solvent filter and properly situated therein immediately prior to conducting of the solvent from the washer to said filter.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a view in elevation, partially broken away, of a filter powder dispenser constructed in accordance with this invention and connected into a solvent cleaning system made in accordance with this invention, Fig. 2 is an enlarged, fragmentary, sectional view of the lower end of the powder conductor chute, Fig. 3 is an enlarged, horizontal, cross-sectional view taken upon the line 3—3 of Fig. 1, and Fig. 4 is an enlarged, fragmentary, isometric view, partially broken away, of the powder measuring mechanism.

While the invention and the system included therein may be applied to a multitude of instances, a specific embodiment of the invention for use in clothing cleaning plants will be described for the sake of simplicity in bringing out the features of the invention and for illustrating its application. However, it is to be kept in mind that the invention is in no way limited to the particular use described but is defined solely by the claims appended thereto.

In the drawing, the numeral 10 designates a solvent conductor pipe leading from the usual type of washing device or machine (not shown) and extending to the ordinary type of filter (not shown) employed in clarifying the solvent and for removing certain materials or substances therefrom. The pipe 10 extends through the customary bucket strainer or button trap which is employed to remove relatively large particles, such as buttons and the like, from the solvent passing from the washer to the filter.

A similar solvent conductor pipe 12 functions as a return line for the solvent and extends between the filter and the washer or washing machine. In the normal course of operation, clothing is placed in the washer and agitated therein in a body of the cleaning solvent or fluid. Various procedures are followed, but the solvent is eventually withdrawn from the washer through the pipe 10, passed through the filter, and then either conducted to suitable storage tanks (not shown), or returned to the washer by means of the pipe 12. Of course, fluid from the storage tanks may also be passed through the pipe 12 in addition to or in place of the fluid flowing from the filtering device. A pump (not shown) is normally disposed in the pipe 10 downstream of the button trap 11 and in advance of the filtering device for drawing the solvent fluid from the washer and forcing it through the filter. The flow through the pipe 12 may be by gravity, under the pressure exerted by the pump in the line 10, or from the pressure developed by a separate pump connected into the pipe 12. The usual and ordinary arrangement is to employ the single pump in the pipe 10 for effecting all of the solvent flow necessary.

The invention is particularly concerned with the powder dispenser, designated generally by the numeral 13, and including an upper cylindrical hopper 14 and an elongate, downwardly extending chute 15, the lower end of the hopper being connected into the upper end of the chute by the usual type of conversion member 16. The lower end 17 of the chute 15 is closed, and the pipe 10 is cut so as to have an inlet connection fitting 18 extending into the lower end of the chute and an outlet connection fitting 19 extending therefrom. Thus, the solvent passing through the pipe 10 also passes through the lower end of the chute 15.

A T-connection 20 is mounted in the pipe 12, and a by-pass pipe 21 extends from said T-connection into and through the side wall of the chute 15 at a point spaced above the lower end of said chute. The by-pass pipe enters the chute at an acute angle above the horizontal so as to direct solvent toward the bottom of the chute. A cut-off valve 22 is provided in the by-pass pipe 21, and a similar valve 23 is positioned in the pipe 12 downstream of the T-connection 20, or between said connection and the washing device. With this arrangement, the valve 23 may be closed and the valve 22 opened to permit fluid to flow through the by-pass pipe 21, into the lower portion of the chute 15, and outwardly from the chute through the pipe 10 to the filtering device. Thus, solvent may be circulated through the filtering device by means of the by-pass 21 without disturbing the operation of the washing device or requiring the addition or withdrawal of solvent fluid thereto or therefrom.

The hopper 14 may be of any suitable or desirable size and has been shown as being relatively small for the sake of convenience. However, it is to be noted that the hopper may be many times as large as the example shown in the drawing so that large amounts of filter powder may be kept on hand at one time. The powder is stored within the hopper and is adapted to flow downwardly through the conversion 16 into the chute 15. For controlling this flow and for permitting measured quantities of the powder to the chute, a pair of vertically-spaced slide valves 24 and 25 extend across the interior of the chute 15 near the upper end thereof. The valves operate in suitable tracks 26 mounted upon the inner walls of the chute 15, and are spaced one above the other so as to define a chamber 27 therebetween. Suitable handles 28 are provided upon the projecting ends of the valves to facilitate their manipulation and movement into and from the interior of the chute 15.

For the purpose of permitting measuring of the quantity of filter powder dispensed, a sight glass 29 is set into one wall of the chamber 27 and carries transverse calibration marks or scored lines 30 indicating various quantities of the filter powder. With this arrangement, the lower valve 25 may be closed, as shown in Fig. 4, and the upper valve 24 opened to permit the filter powder to flow from the hopper onto the upper surface of the valve 25. The flow is continued until the desired amount of powder has dropped into the chamber 27, as indicated by the indicia or calibration marks 30. The valve 24 may then be closed to halt the flow, and the valve 25 opened to permit the measured quantity of filtered powder to drop into the lower portion of the chute 15. If the by-pass 21 is open and fluid is flowing therethrough and through the lower end of the chute 15 to the filtering device, it is obvious that the charge of filter powder dropped into the lower portion of the chute will be picked up by the fluid and carried directly and almost instantaneously to the filtering device. With this accomplished, the positions of the valves 22 and 23 may be reversed and flow of the solvent from the washer to the filter and return, quickly established.

For the purpose of maintaining the contents of the hopper 14 in the desired dry and finely divided condition, a lid 31 is provided for the hopper, and a suitable steam coil 32 is positioned between the double walls 33 of said hopper. Steam is admitted to the coils 32 by a supply pipe 34 and withdrawn therefrom through a condensate pipe 35 carrying the usual steam trap 36. Of course, other means for warming or heating the hopper 14 may be employed, but since most cleaning establishments have a supply of steam available, this structure employing steam heating of the hopper has been found advantageous and convenient. The dispenser further includes an irregularly shaped agitator 37 extending transversely of the conversion 16 and being provided with a handle 38 which projects externally of the conversion and permits manual rotation of the shaker 37 to prevent packing of the filter powder within the conversion and to assure a proper feed of the powder into the chamber 27.

While a variety of cleaning procedures are presently in use, probably the most widely followed involves the loading of the washing machine or device with clothing and the introduction of a quantity of solvent into the washer. The clothing is then agitated in the body of solvent until they have been sufficiently cleaned, at which time the solvent is withdrawn, passed through the filtering device, and continuously circulated back to the washer by way of the pipe 12 to rinse and flush off the clothing within the washer. This continuous circulation of the solvent through the filter and through the washer is continued until the clothing has been sufficiently processed, after which the flow is terminated and the clothing is removed for drying or evaporation of the solvent therefrom. Various dry cleaning soaps are sometimes introduced into the washing device along with the clothing to enhance the cleaning and washing thereof, and it is, of course, desirable that this soap not only be removed from the solvent, but be thoroughly flushed from the clothing. The filter powder dispensed by the present invention is in widespread use in the cleaning industry, and functions not only to build up a filter cake, but also for the purpose of functioning as an absorbing agent to remove grease, dirt, and other contaminants from the cleaning fluid or solvent along with lint from the clothing and the dry cleaning soap, so that the solvent is clarified and purified for re-use.

It has sometimes been the practice to add this filter powder directly to the solvent in the washer in order to cause the powder to pass to the filter along with said solvent when it is withdrawn from the washer. The disadvantage in this method lies in the contamination of the clothing with the filter powder, which is difficult to remove, and in the fact that quantities of the powder accumulate in the bottom of the washer, absorb moisture, and usually sour so as to give off a bad odor and cause the clothing to be undesirably scented.

With the present invention, the filter powder does not enter the washer at any time. During the washing operation, when no solvent is flowing through the washer, the pump may be operated through the by-pass 21 to maintain solvent flow through the filtering device and hold the filter cakes in said device in an intact condition. An exactly measured quantity of the filter powder is admitted to the chamber 27 and held in readiness for introduction into the solvent at the desired time. When the washing operation is completed, the valve 25 is withdrawn, allowing the filter powder to drop into the lower end or portion of the chute 15, at which point it is picked up by the circulating solvent and carried directly and very quickly to the filtering device. Immediately thereafter, the valve 22 may be closed and the valve 23 opened and circulation of clean and filtered solvent through the washing machine immediately established. The dirty and contaminated solvent passing from the washer through the pipe 10 enters the filtering device very shortly after the fresh charge of filter powder, is cleaned and filtered in the filtering device, and returns by the pipe 12 to the washer for rinsing and flushing of the clothing in said washer. The quantity of filter powder employed will normally depend upon the quantity of solvent which must be handled, and adequate provision is made in the sight glass 29 and calibration lines 30 for measuring off the various quantities of the filter powder with exactness whereby an adequate quantity of powder is obtained at all times, but wastage through the use of too much powder is avoided.

One property of filter powder is its ability to absorb water from the cleaning solvent. However, the filter powder will also absorb moisture from the atmosphere, and the storage of such powder often presents a considerable problem. It is not economical to buy very small quantities of the powder at a time, but difficulty is experienced in keeping larger quantities of the powder on hand and preventing said powder from absorbing moisture and thereby having its efficacy considerably reduced or completely lost. The present invention solves this problem by maintaining the store of filter powder within the hopper 14 at an elevated temperature so that moisture is excluded, or driven off as it enters, and by making the hopper 14 of any desired size, any desired quantity of the powder may be kept on hand and be instantly ready for use with no diminishing of its desirable properties. If it is not convenient or desirable to employ an extremely large hopper, the filter powder may be stored in any suitable fashion, since added powder will be present in the upper portion of the hopper 14 and will have an adequate opportunity to dry before it reaches the lower portion thereof. Of course, the maintenance of all of the powder in a thoroughly dried condition is preferable, but with proper attention being paid to refilling of the hopper 14 and by adjustment of the temperatures therein through regulation of the steam pressure in the coil 32, a drying operation within the hopper 14 may be carried out and the size of such hopper held at a minimum.

It is to be noted that the invention includes not only the dispenser described hereinbefore, but the filter system for a solvent having the by-pass line 21, and means for introducing the filter powder into the by-pass circuit.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A filter powder dispenser for dry cleaning fluid filtering systems having an inlet conductor leading to a filter and an outlet conductor leading from the filter for conducting dry cleaning fluid under pressure therefrom, said dispenser including, a hopper, a closed-bottom chute depending substantially vertically from the hopper and in alinement with the vertical axis of the latter, the lower end of the chute having fittings for connection into the inlet conductor of the filtering system, and a by-pass conductor adapted to be connected into the outlet conductor of the filter, said by-pass conductor opening into the lower portion of the chute, said lower portion of the chute being greater in cross-sectional area than the inlet conductor.

2. A filter powder dispenser as set forth in claim 1 wherein the by-pass conductor enters the chute at an angle above the horizontal to direct fluid flowing through the latter conductor toward the lower end of the chute.

3. A filter powder dispenser as set forth in claim 1 wherein the hopper is mounted directly upon the upper end of the chute whereby powder may fall by gravity directly from the hopper into the chute.

4. A filter powder dispenser as set forth in claim 1 wherein the hopper is mounted directly upon the upper end of the chute whereby powder may fall by gravity directly from the hopper into the chute, and a feed control valve in the chute below the hopper.

References Cited in the file of this patent

UNITED STATES PATENTS

| Number | Name | Date |
| --- | --- | --- |
| 563,237 | Porter | June 30, 1896 |
| 652,992 | Arnold | July 3, 1900 |
| 990,369 | Metten | Apr. 25, 1911 |
| 998,994 | Smith | July 25, 1911 |
| 1,284,750 | Munro | Nov. 12, 1918 |
| 1,390,271 | Booth | Sept. 13, 1921 |
| 1,468,966 | Herington | Sept. 25, 1923 |
| 1,645,973 | Sanftleben | Oct. 18, 1927 |
| 1,847,221 | Morgen | Mar. 1, 1932 |
| 1,932,569 | Bell | Oct. 31, 1933 |
| 2,087,775 | Mathews | July 20, 1937 |
| 2,216,921 | Marvel | Oct. 8, 1940 |
| 2,486,650 | Hepp et al. | Nov. 1, 1949 |

FOREIGN PATENTS

| Number | Country | Date |
| --- | --- | --- |
| 268,276 | Germany | June 17, 1913 |
| 535,293 | France | Jan. 23, 1922 |